United States Patent [19]

Hoashi

[11] Patent Number: 4,781,929
[45] Date of Patent: Nov. 1, 1988

[54] COMPOSITE FOOD PRODUCT

[75] Inventor: Chikako Hoashi, Tokyo, Japan

[73] Assignee: Yugenkaisha Matsurei, Tokyo, Japan

[21] Appl. No.: 848,655

[22] Filed: Apr. 7, 1986

[30] Foreign Application Priority Data

Jan. 31, 1986 [JP] Japan .................................. 61-19260

[51] Int. Cl.$^4$ ............................................. A23L 1/325
[52] U.S. Cl. ...................................... 426/92; 426/643
[58] Field of Search ................. 426/92, 302, 564, 574, 426/643, 272, 274, 513, 517

[56] References Cited

U.S. PATENT DOCUMENTS

| | | | |
|---|---|---|---|
| 3,922,372 | 11/1975 | Yoshisuke | 426/643 |
| 3,955,011 | 5/1976 | Hiroshi et al. | 426/574 |
| 4,279,932 | 7/1981 | Koshida et al. | 426/92 X |
| 4,530,847 | 7/1985 | Koichi | 426/643 |

FOREIGN PATENT DOCUMENTS

| | | | |
|---|---|---|---|
| 7025260 | 8/1970 | Japan | 426/574 |
| 7118587 | 5/1971 | Japan | 426/574 |
| 0115851 | 10/1978 | Japan | 426/643 |
| 0116660 | 7/1983 | Japan | 426/564 |
| 0063171 | 4/1984 | Japan | 426/574 |
| 0030068 | 7/1984 | Japan | 426/564 |
| 1021067 | 1/1986 | Japan | 426/643 |

OTHER PUBLICATIONS

Altshul, New Protein Foods, vol. 1A, Academic Press, N.Y., 1974, pp. 435–437.

Primary Examiner—Arthur L. Corbin
Attorney, Agent, or Firm—Beveridge, DeGrandi & Weilacher

[57] ABSTRACT

Composite food products prepared from minced fish meat comprising a hanpen-like food material and a kamaboko-like food material bonded thereto are disclosed. During eating, these products are crispy and have a soft and elastic texture.

12 Claims, 4 Drawing Sheets

COMPOSITE FOOD PRODUCT

BACKGROUND OF THE INVENTION

1. Field of the Invention

The present invention concerns a composite food product which is a bonded product of "hanpen" (floated-type kamaboko)-like foamed food materials having a high cell or foam content and "kamaboko" (boiled fish paste)-like foamed food materials having a cell content less than that of the hanpen-like food materials. The composite food products of the present invention can be used for different cooking purposes such as frying, boiling, roasting or the like.

2. Description of the Related Art

Fish jelly products typical examples of which include kamaboko, hanpen or other foamed food products are generally produced from raw fishes such as codfish (theragre chalc cogramma), croaker, shark, bastard halibut or yellow fish (akta mackerels), or minced meat thereof. The minced or unminced fish meat is salted with 2 to 4% of a common salt, ground and mixed with any additives such as seasonings, starch or the like. After gelling by extracting salt-melting-protein, the mixture is molded to any desired shape, left to stand while maintaining its molded shape and finally heated. Particularly, the kamaboko is produced under the controlled conditions to avoid an excessive introduction of foams into the fish meat as a starting material. On the contrary, the hanpen is produced in such a manner that a sufficient amount of foams are contained in the resulting one. It is apparent from this fact that the kamaboko has a relatively hard texture, while the hanpen has a relatively soft texture. It is the case that the texture of the kamaboko, hanpen or other foamed fish jelly products are controlled with the change of their cell or foam content to give a variety of taste thereto.

Such fish jelly products are sometimes eaten without further processing. Namely, they are eaten after dressing with a "shoyu" (soy sauce) and grated "wasabi" (eutrema wasabi maxim). Further, they are sometimes fried in an edible oil, used as an ingredient in the cooking of "oden" (Japanese hotch potch) or roasted on an oiled frying pan. The fish jelly products cooked thus have a varied taste in addition to an improved taste.

However, the hanpen suffers from several drawbacks. For example, the hanpen tends to result in a slimy feeling in eating due to its surface wetted with water, because it is previously heated in a boiled water to cause a gelation of the minced fish meat. A sliminess of the hanpen is more increased when the hanpen is dipped and heated in a stock, since the porous surface of hanpen can be easily impregnated with the stock. As a result, an appropriate elasticity which is an essential feature of the hanpen is notably lost.

Further, the hanpen, when it is roasted on an oiled frying pan, can frequently receive the coated oil and therefore result in an oily surface which is not good to eating.

Furthermore, the food products having a high cell content such as the hanpen are usually expanded upon cooking with heat. As a result, an original net or open-cell structure of the products is destroyed, thereby causing an escape of air from the products. Since the degassed products reduce their volume, they are finally deformed and lose their soft and elastic texture. As a typical example, when the hanpen is fried after coating with a wheat flour, the fried hanpen is deformed with an action of heat and therefore gaps are formed between the hanpen and its coating.

Similarly, the kamaboko has some undesirable tendencies. After cooking or roasting, the kamaboko is hardened with remarkable shrinkage. This means a dull taste of the kamaboko.

It is, therefore, an object of the present invention to provide an improved food product by bonding hanpen-like formed food materials and kamaboko-like less formed food materials which, after cooking or roasting, has a soft and elastic texture and a crisp feeling in eating.

Another object of the present invention is to provide an improved food product which, when cooked, does not result in its deformation which has been frequently experienced in the cooking of the foamy food products such as the hanpen, for example.

SUMMARY OF THE INVENTION

According to the present invention, there is provided a novel composite food product which is a bonded product of the hanpen-like food materials having a high cell content and the kamaboko-like food materials which cell content is less than that of the hanpen-like materials.

When the composite food product of the present invention is subjected to cooking or roasting, an impregnation of the stock or oil into the hanpen-like food materials can be effectively inhibited. This is particularly effective to prevent a swelling of the food materials due to an excessive impregnation of the stock or oil. With regard to the kamaboko-like food materials, such an inhibition of the excessive impregnation of the stock or the like ensures the food materials to have a crisp taste. Therefore, using the composite food product according to the present invention as a cooking material, a good and crisp taste resulting from the kamaboko-like food materials can be obtained, while maintaining a soft and elastic texture of the hanpen-like food materials.

As an embodiment of the present composite food product, when an outer peripheral surface of the hanpen-like food materials is surrounded and bonded with the kamaboko-like food materials, the resulting food product can prevent a breakdown of the net structure of the hanpen-like inner materials, because, upon heating and cooking, an expansion of the inner materials is limited by the kamaboko-like outer materials. Therefore, in this composite food product, a soft and elastic texture of the hanpen-like food materials and their good taste are maintained during cooking with heat.

In the present invention, the term "hanpen-like food materials" used herein is intended to mean a food material which has a lot of fine foams or cells throughout its structure and therefore possesses a soft texture and an elastic surface. The term "kamaboko-like food materials" used herein is intended to mean a food material which has a foam or cell content less than that of the hanpen-like food materials and therefore has a relatively hard texture and a hard elasticity.

In the composite food product of the present invention, there is a substantial difference between the foam or cell content of the hanpen-like food materials and that of the kamaboko-like food materials. Such a difference of the cell content, when represented in terms of a difference in specific gravity between the hanpen-like and kamaboko-like food materials, is 0.1 or more, and preferably 0.2 or more. A difference in specific gravity between the hanpen-like and kamaboko-like food materials of below 0.1 will result in insufficient effects of the present invention. More preferably, in order to fully attain excellent characteristics of both of the hanpen-like and kamaboko-like food materials, a specific gravity of the former is below 0.7 and that of the latter is above 0.7. Alternatively, the kamaboko-like food materials may contain no foam or cell.

Generally, a minced fish meat is preferably used as the starting hanpen-like and kamaboko-like food materials in the production of the composite food products according to the present invention. In addition, if desired, other types of meat such as a paste of butcher's meat or poultry meat, preferably pasted meat of chicken or broiler, for example, may be used as the starting materials. These meats may be used separately or in combination depending on the desired particulars of the composite food product. As a preferred embodiment, the minced fish meat may be mixed with a paste of the butcher's meat or poultry meat, soybean protein and other ingredients. In any case, the amount of the foams or cells incorporated into the hanpen-like food materials is increased, while that of the kamaboko-like food materials is reduced or naught.

Using the minced fish meat as a main starting material, the composite food products of the present invention can be produced in the manner described hereinafter, for example. The minced fish meat is prepared from raw fishes such as codfish, croaker, shark, bastard halibut, yellow fish or other white flesh fishes. These raw fishes may be minced or unminced at the first stage. These fishes are mixed with additives such as a common salt, a potato starch, monosodium glutamate, sugar, "mirin" (cooking "sake"), water or the like, and the mixture is thoroughly kneaded using any conventional agitator or kneader.

Fine foams or cells are then incorporated into the kneaded fish meat. This may be attained by intentionally stirring the fish meat or stirring the fish meat with enforced bubbling of air, for example. In the formation of the foamed fish meat, it is necessary to control the stirring process so that the stirred products for use as the hanpen-like food materials have a higher foam content and the products for use as the kamaboko-like food materials have a lower foam content. Effective means to increase the foam content of the stirred products are to add to the minced fish meat any additives capable of entrapping air bubbles in the fish meat, for example, yam, albumen, foaming agents or the like, or to enhance processing conditions used, for example, stirring velocity, stirring time, amounts of the bubbled air or the like.

After the foam formation, the resulting products are molded to any desired shape depending upon their intended uses. The hanpen-like food materials and the kamaboko-like food materials are thus produced. Thereafter, the selected hanpen-like and kamaboko-like food materials are combined and bonded to produce a composite food product of the present invention.

The hanpen-like food materials can be combined and bonded with the kamaboko-like food materials using a variety of different manners. In a preferred embodiment of the present invention, they can be bonded after each of them was molded to a flat product such as plates or sheets. The molded products are then adhered to each other. Preferably, a plate or sheet of the hanpen-like food materials can be sandwiched with two plates or sheets of the kamaboko-like food materials. Alternatively, a layered hanpen-like food material can be bonded with a layered kamaboko-like food material or, otherwise, the above step can be relplated two or more times to produce an integral multilayer product having alternately disposed layers of the hanpen-like and kamaboko-like food materials.

In the embodiment described above, a layer thickness of each of the hanpen-like and kamaboko-like food materials may be widely varied depending upon the specific composite food product, bonding method employed or the like. When it is intended to maintain and particularly emphasize a soft and elastic texture which is inherent to the hanpen-like food materials, a layer thickness of the kamaboko-like food materials should be preferably controlled so that it is relatively thin. In practice, the layer thickness of the kamaboko-like food materials is generally 5 mm or less, preferably 3 mm or less, more preferably 2 mm or less.

As a modification of these laminated food products, any eatable materials such as cheese slices or powders, leaves of perilla or the like may be inserted between layers of the hanpen-like and kamaboko-like food materials, if desired. The insertion of these material will increase a taste of the resulting food products and, when the layer thickness of the kamaboko-like food materials is very thin, will enhance an appearance of the products because the inserted ingredients are viewed through the overlying translucent kamaboko layer.

As stated hereinbefore, the hanpen-like and kamaboko-like food materials are bonded after their molding. Namely, the molding and subsequent bonding steps are separately carried out. Further, if it is desired and appropriate, these two steps may be concurrently carried out using a specially designed molding machine. The latter method can be preferably utilized in the practice of the present invention.

According to another preferred embodiment of the present invention, the hanpen-like food materials and the kamaboko-like food materials can be concurrently extruded and molded so that, in the resulting composite structure, an outer peripheral surface of the hanpen-like materials is covered with the kamaboko-like materials. In this case, an outer surface of the hanpen-like materials may be entirely or partially surrounded by the kamaboko-like materials. A typical example of the composite food products according to the above-described embodiment of the present invention comprises a rod-shaped hanpen-like food material with an outer sheath of the tubular kamaboko-like food material.

Finally, the molded and bonded product comprised of the hanpen-like and kamaboko-like food materials is subjected to a heating treatment to cause a gelation of the minced fish or other meat. A composite food product of the present invention is thus obtained. Heating can be carried out using any conventional means such as steaming, heating on an electric or gas oven or boiling in a hot water. If desired, the extruded composite product may be wrapped with a casing and then boiled in a hot water. During heating, the hanpen-like materials and the kamaboko-like materials may be pressed against each other in order to increase an adhesion strength therebetween.

The composite food products of the present invention thus obtained can be utilized as a cooking material for a variety of cooking purposes including eating of the fresh or uncooked one. They can be used as a main ingredient in the preparation of "oden" (Japanese hotch potch), roasted on an oiled frying pan or fried in a heated edible oil, for example. In the cooked composite food products, a soft and elastic texture of the hanpen-like materials is maintained without loss because the stock, oil or the like used in the cooking was moderately permeated into an interior of the materials, and simultaneously a crispy taste of the kamaboko-like materials is obtained. A soft and elastic texture of the hanpen-like materials is also attained when a peripheral surface of the hanpen-like materials is surrounded by the kamaboko-like materials. This is because, as previously described, a breakdown of the foam structure of the hanpen-like materials is prevented as a result of inhibition of their excessive expansion, upon heating, by the kamaboko-like materials.

Also, it should be noted that the kamaboko-like food materials used in the composite food products of the present invention may have a suitably fabricated surface. For example, their surface may have projections and recesses in any desired patterns and configurations. The projections will give an attractive and beautiful roasted surface to the resulting food products upon broiling or grilling of the same on the frying pan or the like.

DESCRIPTION OF THE PREFERRED EMBODIMENTS

Figure 1:
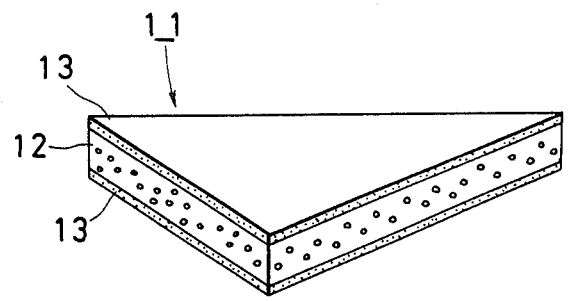
FIG. 1 is a perspective view illustrating and embodiment of the composite food products according to the present invention.

FIG. 1 illustrates a preferred embodiment of the composite food products according to the present invention. A composite food product 11 is in the form of a right-angled triangular plate and comprises an interlayer 12 of the hanpen-like food material sandwiched between two outer layers 13 of the kamaboko-like food material.

The starting hanpen-like food material used in the interlayer 12 of the composite food product was prepared by adding 3.5 parts by weight of a common salt, 10 parts by weight of sugar, 0.06 parts by weight of monosodium glutamate, 15 parts by weight of yam, 30 parts by weight of albumen and 30 parts by weight of water to a mixed meat of 50 parts by weight of shark (glyphis glaucus) and 50 parts by weight of codfish (theragre chalc cogramma). The mixture was then blended using an agitator in such a manner that a plurality of fine foams are formed therein.

Similarly, the starting kamaboko-like food material for use in the outer layers 13 was prepared by blending 100 parts by weight of a salted meat of codfish with 1.5 parts by weight of a common salt, 0.05 parts by weight of monosodium glutamate, 15 parts by weight of starch, 10 parts by weight of sugar and 30 parts by weight of water in an agitator.

Figure 2:
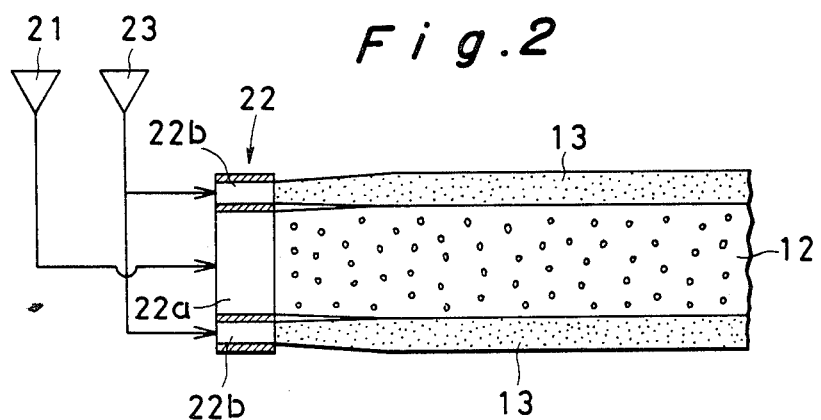
FIG. 2 is a cross-sectional view illustrating a production of the composite food product of FIG. 1, FIGS. 3 to 7 each is a perspective view illustrating other embodiments of the composite food products according to the present invention.

These starting food materials were then molded to produce a composite food product. For this molding, a specially designed extrusion molding machine provided with an opening 22 comprising a central nozzle 22a and two outer nozzles 22b was used (see FIG. 2). As is shown in FIG. 2, the starting hanpen-like food material was charged into a hopper 21 of the extruder and then extruded from the nozzle 22a to form a layered product having a layer thickness of 10 mm. The starting kamaboko-like food material was charged into a hopper 23 and then extruded from the nozzles 22b to form two layered products each having a layer thickness of 2 mm. These layered product were concurrently extruded and bonded to form a longitudinally extended composite sheet of the hanpen-like food material 12 and the kamaboko-like food material 13 as in FIG. 2.

Thereafter, the composite sheet was heated by boiling it at 85° C. for 10 minutes. A minced fish meat of the sheet was thus gelled. After gelation and cooling, the sheet was cut into many right-angled triangular plates. One of the triangular plates is shown in FIG. 1 which has been described hereinabove. In the triangular plate or composite food product 11 of FIG. 1, the hanpen-like food material 12 and the kamaboko-like food material 13 have a specific gravity of 0.5 and 1.0, respectively.

The composite food product 11 thus produced was cooked to evaluate its excellent characteristics. When the product 11 was added to and boiled in a seasoning stock having added thereto "syoyu" (soy), "kstsuobushi" (pieces of a dried bonito) and the like, the hanpen-like food material 12 of the product 11 showed its original characteristic, namely, soft and elastic texture, because an excessive impregnation of the seasoning stock into the material 12 was prevented by the presence of the kamaboko-like food material 13 which covers both surfaces of the material 12 and therefore the material 12 did not swell up. Further, the soft and elastic texture of the material 12 was enhanced by a crisp feeling, in crushing with the teeth, of the material 13 having a hard elasticity and hard texture.

Figure 3:
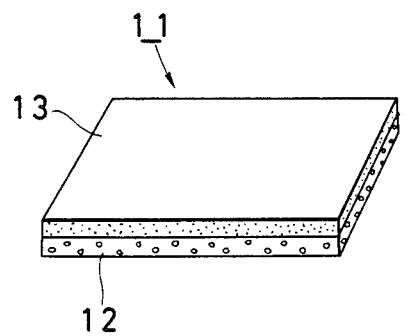

FIG. 3 illustrates another preferred embodiment of the composite food products of the present invention. The illustrated composite food product 11 comprises a rectangular plate 12 of the hanpen-like food material having bonded to a surface thereof a kamaboko-like food material 13 of the same configuration. This product was produced in accordance with the following manner:

The starting hanpen-like food material used herein was the same as that of the above first embodiment which was described with reference to FIGS. 1 and 2.

The starting kamaboko-like food material used herein was prepared by adding 2.5 parts by weight of a common salt, 0.3 parts by weight of pepper, 0.1 parts by weight of sage, 0.05 parts by weight of ginger, 3 parts by weight of water, 5 parts by weight of yam, 0.2 parts by weight of "Foam Up" (trade name, commercially available from Riken Vitamin Kabushiki Kaisha) and 0.2 parts by weight of "SK 5" (trade name, commercially available from Kaihatsu Kagaku Kabushiki Kaisha) to 100 parts by weight of a chicken meat. The mixture was thoroughly kneaded using an agitator.

Each of the resultant starting materials was molded with an extrusion machine to a longitudinal sheet form. After two different sheets were combined and bonded, a composite sheet obtained was cut to a desired length and then heated with a steam at 80° C. for 15 minutes. The composite food product illustrated in FIG. 3 was thus obtained.

In the composite food product 11 of FIG. 3, a thickness of the hanpen-like food material 12 was 8 mm and that of the kamaboko-like food material 13 was 7 mm (total thickness of 15 mm). Further, it was determined that the hanpen-like material 12 has a specific gravity of 0.5 and the kamaboko-like material 13 has a specific gravity of 0.7.

Figure 4:
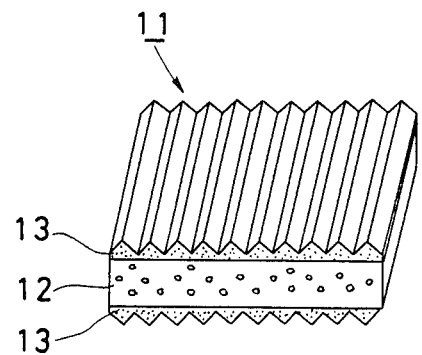

FIG. 4 also illustrates another preferred embodiment of the composite food products of the present invention. The composite food product 11 of this illustration comprises a rectangular plate 12 of the hanpen-like food material and two rectangular plates 13 of the kamaboko-like food material. As is shown, each of the plates 13 has a corrugated outer surface with the serrated cross-section.

The illustrated composite food product was produced using a manner substantially similar to that previously described referring to FIGS. 1 and 2 except that, in the outer nozzle 22b of the extruder of FIG. 2, a cross-section of each of them was changed to a serrated one.

When the composite product 11 of FIG. 4 was roasted on an oiled frying pan, only projected portions of the kamaboko-like food material 13 were intensively scorched. A beautiful and impressive scorching pattern was thus formed on the product. It was also found that since the oil was moderately impregnated into the product, a good and satisfactory taste was attained in the roasted product.

Figure 5:
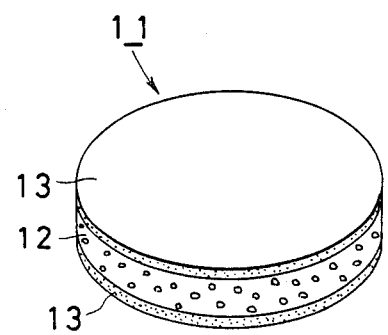

FIG. 5 illustrates still another preferred embodiment of the composite food products according to the present invention. The composite food product 11 is in the form of a disc and comprises a center layer 12 of the hanpen-like food material sandwiched with two outer layers 13 of the kamaboko-like food material. The starting materials and production process used in the production of the product 11 were substantially the same as those of the first embodiment with reference to FIGS. 1 and 2 with the proviso that the composite sheet obtained in this example was molded using a cutting die to produce a plurality of disc-shaped products 11. Similar good results were obtained.

Figure 6:
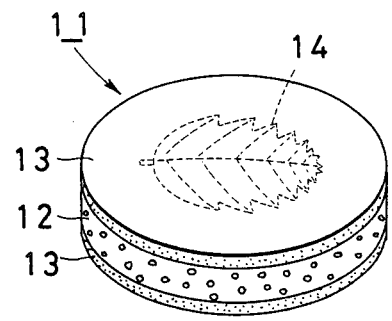

A modification of the disc-shaped composite food product of FIG. 5 can be found in FIG. 6. As is apparent from these drawings, the composite product 11 of FIG. 6 is identical with that of FIG. 5 with the proviso that the former contains in addition a leaf 14 of perilla. The perilla leaf 14 (two occurrences) was disposed between the hanpen layer 12 and the kamaboko layer 13 having a thin thickness. The starting materials and production process used in the production of the illustrated composite food product were substantially the same as those of the first embodiment referred to FIGS. 1 and 2 except for the insertion of the perilla leaves. The perilla leave-containing food product 11 of FIG. 6 is characterized in that each of its perilla leaves 14 can be clearly viewed through the overlying thin layer 13 of the kamaboko-like food material.

Figure 7:
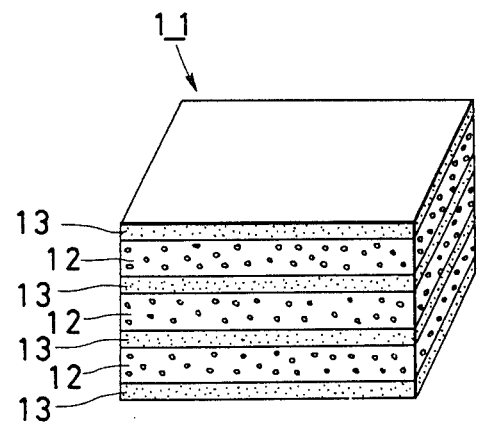

Still another embodiment of the composite food products according to the present invention can be found in FIG. 7. The composite food product 11 shown in FIG. 7 has a multilayer structure in which the hanpen-like food material 12 and the kamaboko-like food material 13 are alternately superposed. As is shown, it comprises three layers of the hanpen-like food material 12 and four layers of the kamaboko-like food material 13. Unexpectedly, this composite food product 11 provided a varied taste which was resulted from significant differences in the texture between the hanpen-like material 12 and the kamaboko-like material 13 and recurrences of such differences in the texture.

Figure 8:
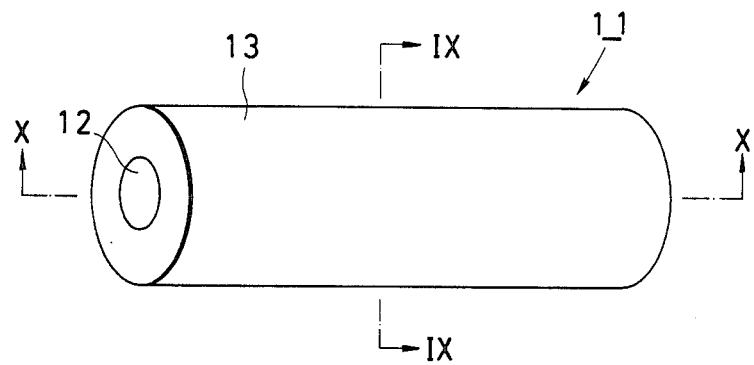
FIG. 8 is a perspective view illustrating a still another embodiment of the composite food products according to the present invention.
Figure 9:
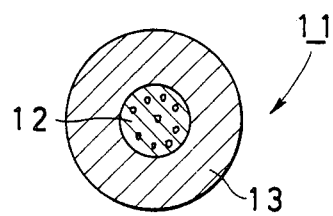
FIG. 9 is a cross-sectional view of the composite food product taken along line IX—IX of FIG. 8.
Figure 10:
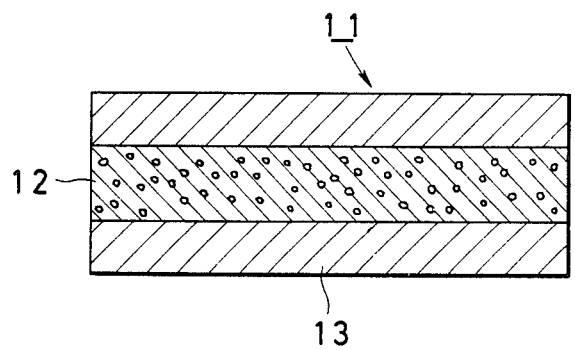
FIG. 10 is a cross-sectional of the composite food product taken along lines X—X of FIG. 8.

Furthermore, still another embodiment of the composite food products of the present invention is particularly illustrated in FIGS. 8, 9 and 10. The illustrated composite food product 11 is intented to eat after heating and, as a whole, has a form of the cylindrical rod. It is apparent from FIG. 8 that the composite food product 11 comprises a cylindrical bar 12 of the hanpen-like food material as a core, a peripheral surface of which bar is surrounded with a tubular portion 13 of the kamaboko-like food material as a shell. The core-shell structure of this composite food product 11 is more apparent from FIG. 9 which is a lateral cross-sectional view of the product of FIG. 8 taken along its IX—IX line and from FIG. 10 which is a longitudinal cross-sectional view of the product of FIG. 8 taken along its X—X line. In other words, in the composite food product 11, the hanpen-like food material 12 is embedded in and is axially extended through the interior of the kamaboko-like food material 13. This composite food product 11 could be produced as follows:

The starting hanpen-like food material and the starting kamaboko-like food material were prepared as in the first embodiment described referring to FIGS. 1 and 2, respectively. These starting materials were concurrently extruded from concentrical double-cylinder nozzles of the extrusion molding machine. The core-forming starting material was extruded from an inner cylindrical nozzle of the molding machine, while the shell-forming starting material was extruded from an outer ring-shaped nozzle which is concentrical with said cylindrical nozzle. After extrusion, the product was heated at 35° C. for 2 hours for setting purposes and then steamed at 85° C. for 25 minutes. Cutting was finally made to obtain the desired composite food product 11.

Thereafter, the composite food product 11 was fried by coating it with a batter of wheat flours. The coated product was further coated with powdered bread (flour) and then fried in an edible oil at a high temperature. The fried product had a coating of the flour batter firmly and closely adhered to a surface thereof. Further, it was moderately hard to chew and had a good taste. This is because, when the outer kamaboko-like food material 13 having a hard texture and hard elasticity was cut off with the teeth, the inner hanpen-like food material 12 having a soft and elastic texture was thus exposed.

For comparison purposes, a control food product which is in the form of a cylindrical rod, but consists only of the hanpen-like food material which composition is identical with that of the above example of the present invention was produced and fried following manner described just above. The results were unsatisfactory, because this hanpen-like food product as the control lost its original, i.e., pre-frying, configuration and size as a result of remarkable reduction of the volume upon frying. Further, a coating of the flour batter was separated from the surface of the fried product. Furthermore, the fried product did not give a soft and elastic texture during eating, and showed a reduced taste.

The composite food product 11 illustrated in FIGS. 8, 9 and 10 may have any variations. As a significant variant, the kamaboko-like food material 13 based on the minced codfish meat may be replaced with a similar one based on the pork. This new type of the composite food product could be produced as follows:

The starting hanpen-like food material was prepared as in the first embodiment described hereinbefore referring to FIGS. 1 and 2. The starting kamaboko-like food material was prepared by adding 2.5 parts by weight of a common salt, 0.3 parts by weight of pepper, 0.1 parts by weight of sage, 0.05 parts by weight of ginger and 3 parts by weight of water to 100 parts by weight of the pork and thoroughly kneaded the mixture in an appropriate agitator.

The resulting starting materials were concurrently extruded from the concentrical double-cylinder nozzles of the extrusion molding machine which was used in the production process described above with reference to FIGS. 8, 9 and 10. The extruded product was packed with a casing and heated in a hot water at 85° C. for 30 minutes.

The thus produced composite food product was roasted for 3 minutes in a gas oven after its casing was removed. It was found that the internally occurring hanpen-like food material enoughly maintained its soft and elastic texture, and, in addition, a very good taste and deliciousness was attained as a combination of a sausage taste of the kamaboko-like food material and a hanpen taste of the hanpen-like food material.

While the present invention was described hereinable in detail with references to its specific preferred embodiments, it should be noted that any modification or alteration may be carried out within the spirit and scope of the present invention.

I claim:

1. A composite food product which consists of a hanpen-like food material with a high cell content and a kamaboko-like food material with a cell content lower than that of the hanpen-like food material such that the difference in specific gravity between the hanpen-like and kamaboko-like food material is at least 0.1, the kamaboko-like food material being bonded to the hanpen-like food material so that the hanpen-like food material is put between or wrapped with the kamaboko-like food material, the thickness of the kamaboko-like material being such that a breakdown of the cell content structure of the hanpen-like material is prevented as a result of inhibition of excessive expansion upon heating or cooking of the composite food product.

2. The composite food product as in claim 1 in which each of the hanpen-like and kamaboko-like materials is based on a minced fish meat.

3. The composite food product according to claim 2 in which each of the hanpen-like and kamaboko-like materials is in the form of a layer.

4. The composite food product according to claim 2 in which a peripheral surface of the hanpen-like material is covered and bonded with the kamaboko-like material.

5. The composite food product as in claim 1 in which each of the hanpen-like and kamaboko-like materials is in the form of a layer.

6. The composite food product as in claim 5 in which a layer of the hanpen-like material is sandwiched between layers of the kamaboko-like material.

7. The composite food product as in claim 1 in which a peripheral surface of the hanpen-like material is covered and bonded with the kamaboko-like material.

8. The composite food product as in claim 1 in which the difference in specific gravity between the hanpen-like material and the kamaboko-like material is 0.2 or more.

9. A composite food product which consists of (i) molded hanpen-like food material with a high cell content and (ii) molded kamaboko-like food material with a cell content lower than that of the hanpen-like food material, the molded kamaboko-like food material being bonded to the molded hanpen-like food material so that the hanpen-like food material is put between or wrapped with the kamaboko-like food material in which the difference in specific gravity between (i) and (ii) is 0.2 or more, the specific gravity of (i) is below 0.7 and the specific gravity of (ii) is 0.7 or above 0.7, the thickness of the kamaboko-like material being such that a breakdown of the cell content structure of the hanpen-like material is prevented as a result of inhibition of excessive expansion upon heating or cooking of the composite food product.

10. The composite food product as in claim 9 wherein the thickness of the kamaboko-like material is 5 mm or less.

11. The composite food product as in claim 9 wherein the thickness of the kamaboko-like material is 3 mm or less.

12. The composite food product as in claim 9 wherein the thickness of the kamaboko-like material is 2 mm or less.

* * * * *